United States Patent
Frank et al.

(10) Patent No.: US 7,127,216 B2
(45) Date of Patent: Oct. 24, 2006

(54) INTEGRATED CIRCUIT AND METHOD FOR RECEIVING AND TRANSMITTING SIGNALS OF DIFFERENT FREQUENCY BANDS

(75) Inventors: Michael Louis Frank, Los Gatos, CA (US); John A. Swenson, Fort Collins, CO (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 352 days.

(21) Appl. No.: 10/884,902

(22) Filed: Jul. 6, 2004

(65) Prior Publication Data

US 2006/0009256 A1  Jan. 12, 2006

(51) Int. Cl.
*H04B 1/44* (2006.01)
*H04B 1/04* (2006.01)
*H04M 1/00* (2006.01)

(52) U.S. Cl. .................. 455/83; 455/127.4; 455/552.1
(58) Field of Classification Search .................. 455/73, 455/79, 80, 82, 83, 88, 556.1, 13.4, 552.1, 455/572, 553.1, 463, 464, 102, 103, 146, 455/127.1, 287, 127.2, 333, 127.3, 340, 127.4, 455/168.1, 169.1, 178.1, 176.1, 180.1, 188.1, 455/67.13; 330/51, 151, 103
See application file for complete search history.

(56) References Cited

U.S. PATENT DOCUMENTS

| | | | | |
|---|---|---|---|---|
| 5,054,114 A | * | 10/1991 | Erickson | 455/78 |
| 5,911,116 A | * | 6/1999 | Nosswitz | 455/83 |
| 6,014,551 A | * | 1/2000 | Pesola et al. | 455/83 |
| 6,704,550 B1 | * | 3/2004 | Kohama et al. | 455/83 |
| 6,917,789 B1 | * | 7/2005 | Moloudi et al. | 455/78 |
| 7,010,274 B1 | * | 3/2006 | Choi | 455/83 |
| 2002/0086644 A1 | | 7/2002 | Koskinen | |

* cited by examiner

*Primary Examiner*—Aung Moe

(57) ABSTRACT

An integrated circuit and method for receiving and transmitting signals of different frequency bands utilizes a switching device on a bypass current path to selectively route incoming and outgoing signals by circumventing a capacitive device on a receive signal path. The bypass current path is used to selectively conduct current through a variable resistance device on a transmit signal path to transmit or block signals through the variable resistance device.

20 Claims, 2 Drawing Sheets

INTEGRATED CIRCUIT AND METHOD FOR RECEIVING AND TRANSMITTING SIGNALS OF DIFFERENT FREQUENCY BANDS

BACKGROUND OF THE INVENTION

The current trend for the cellular technology is cellular phones that can be used in areas of different wireless communication standards. As an example, there are four Global System for Mobile communications (GSM) bands in use around the world. Two of these GSM bands, GSM 850 and GSM 1900, are used almost exclusively in North America, while the other two bands, GSM 800 and GSM 1800, are widely used in other parts of the world. The numbers after "GSM" refer to the center frequency in megahertz (MHz). Since there are four GSM bands, cellular phone components such as switch modules and power amplifiers have been developed to support some or all of the available GSM bands.

A prior art switch module of interest includes two bi-directional signal paths to both receive and transmit signals on each of the bi-directional signal paths. The first bi-directional signal path is used to receive and transmit signals in the GSM 1800 and GSM 1900 bands, while the second bi-directional signal path is used to receive and transmit signal in the GSM 850 and GSM 900 bands. Each bi-directional signal path is connected to an exclusive receive signal path and an exclusive transmit signal path. The switch module utilizes high and low pass filters to direct incoming signals to the proper bi-directional signal paths. Furthermore, since GSM cellular phones are half-duplex cellular phones, the switch module utilizes diodes to isolate the receive path from the corresponding transmit signal path to switch between receiving and transmitting modes. The use of diodes is superior to the use of transistors with respect insertion loss for simple switches such as above.

A prior art power amplifier module of interest that can be used with the above-described prior art switch module includes two signal paths that connect to the corresponding transmit signal paths of the switch module. On each of these two signal paths of the power amplifier module, an amplifier, an output matching network and a capacitor are connected in series. The amplifier provides amplified signals for transmission. The output matching network transforms the impedance of the amplifier from it's native impedance (e.g., 1 or 2 Ohms) to the required impedance of the antenna (e.g., 50 Ohms). The capacitor blocks current from being conducted to downstream circuits in the switching module so that the downstream circuits are not biased inadvertently.

Similar to other electronic components for handheld devices, there is a continuing need for smaller cellular phone components, such as switching modules and power amplifier modules. This continuing need is driven by the desire of consumers for compact cellular phones, as well as cellular phones with increased functionalities, such as color screens, digital cameras and/or Global Positioning Systems (GPS). These functionalities require additional space, which necessitates even smaller traditional cellular phone components to produce the compact cellular phones. In addition to space, each of these functionalities places a demand on the cellular phone battery, which reduces the overall operable life of a cellular phone. Therefore, the traditional cellular phone components such as switching modules and power amplifier modules need to be small in size and power efficient.

SUMMARY OF THE INVENTION

An integrated circuit and method for receiving and transmitting signals of different frequency bands utilizes a switching device on a bypass current path to selectively route incoming and outgoing signals by circumventing a capacitive device on a receive signal path. The bypass current path is used to selectively conduct current through a variable resistance device on a transmit signal path to transmit or block signals through the variable resistance device. The switching device allows the integrated circuit to be switched between a transmitting mode and a receiving/standby mode.

An integrated circuit for receiving and transmitting signals of different frequency bands in accordance with an embodiment of the invention comprises an amplifier on a first signal path to provide outgoing signals of at least one frequency band, an output matching network connected in series with the amplifier on the first signal path, a variable resistance device, e.g., diode, connected in series with the output matching network, a capacitive device, e.g., a capacitor, on a second signal path connected to the first signal path, a transmission line connected in series with the capacitor on the second signal path, and a switching device connected on a third signal path that circumvents the capacitor.

A method for receiving and transmitting signals of different frequency bands in accordance with an embodiment of the invention comprises receiving incoming signals of at least one frequency band, filtering the incoming signals based on frequency, and selectively routing the incoming signals through a receive signal path for processing. The selective routing includes circumventing a capacitive device on the receive signal path to conduct current through a variable resistance device on a transmit signal path connected to the receive signal path to prevent the incoming signals from traveling through the transmit signal path.

Other aspects and advantages of the present invention will become apparent from the following detailed description, taken in conjunction with the accompanying drawings, illustrated by way of example of the principles of the invention.

DETAILED DESCRIPTION

Figure 1:
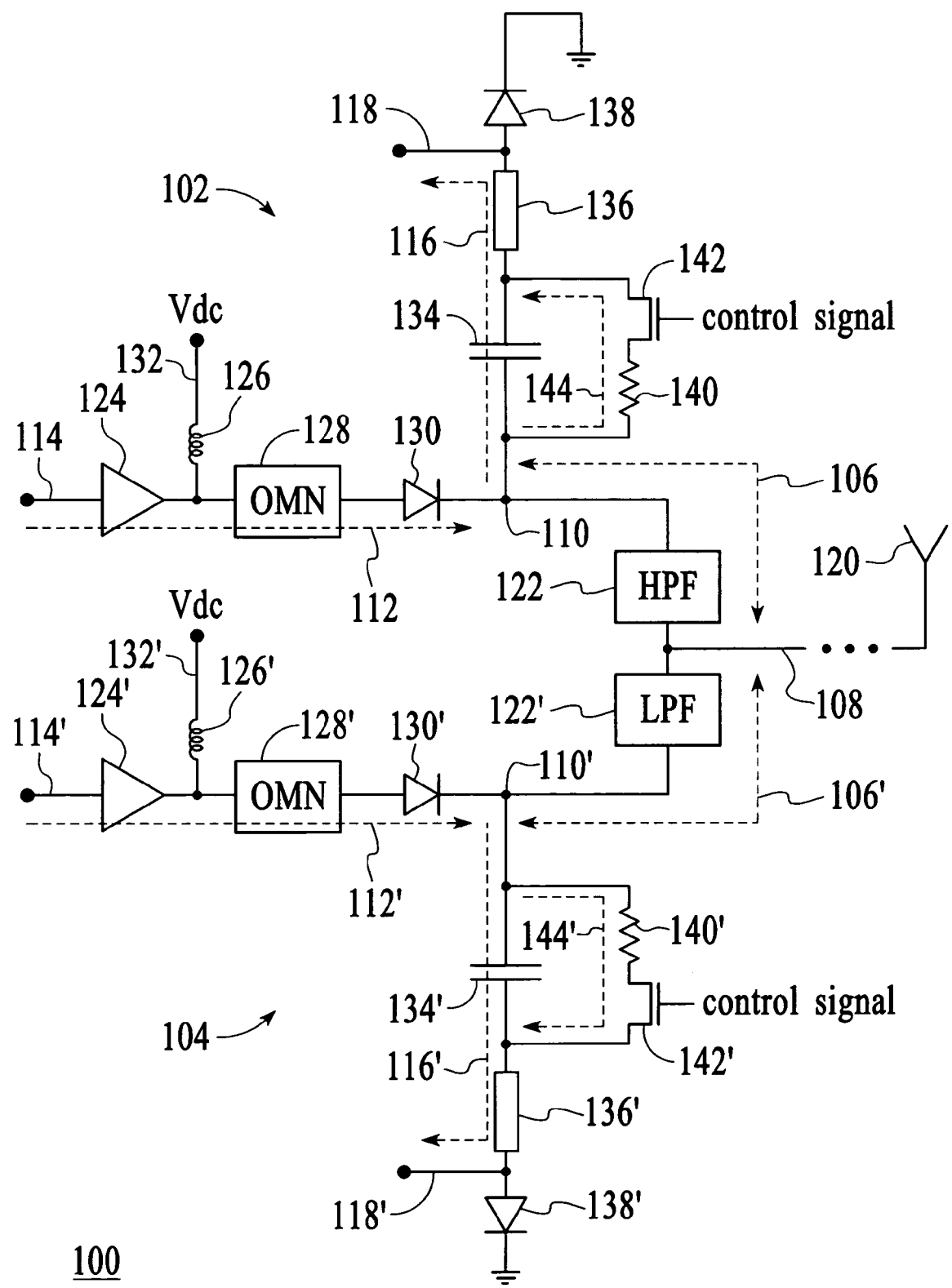
FIG. 1 is a diagram of an integrated switching and power amplifier circuit in accordance with an embodiment of the invention.

With reference to FIG. 1, an integrated switching and power amplifier circuit 100 for receiving and transmitting radio frequency (RF) signals of different frequency bands in accordance with an embodiment of the invention is described. As an example, the integrated circuit 100 can be used to receive and transmit RF signals in the following frequency bands: GSM 850, GSM 900, GSM 1800 and GSM 1900. The integrated circuit 100 performs the functions of a conventional switch module and a conventional power amplifier module. The integrated circuit 100 can be implemented in a single module that requires less space than two separate switch and power amplifier modules. In addition, the integrated circuit 100 provides greater power efficiency than conventional switch and power amplifier modules.

As shown in FIG. 1, the integrated circuit 100 includes a higher frequency band unit 102 and a lower frequency band unit 104. The higher frequency band unit 102 is used to receive and transmit RF signals in higher frequency bands, such as GSM 1800 and GSM 1900. The lower frequency band unit 104 is used to receive and transmit RF signals in lower frequency bands, such as GSM 850 and GSM 900. These frequency band units 102 and 104 are similar in structure and operation, and thus, only the higher frequency band unit 102 is described in detail herein.

The higher frequency band unit 102 includes a bi-directional signal path 106 connected to a receive-and-transmit terminal 108 and an intersecting node 110. The higher frequency band unit 102 further includes a transmit signal path 112 connected to a transmit terminal 114 and the intersecting node 110, and a receive signal path 116 connected to a receive terminal 118 and the intersecting node 110. The receive-and-transmit terminal 108 is connected to an antenna 120 to receive and transmit RF signals. The receive-and-transmit terminal 108 is common to both the higher and lower frequency band units 102 and 104. The transmit signal path 112 is used for transmitting outgoing RF signals from the transmit terminal 114, while the receive signal path 116 is used for routing received incoming RF signals to the receive terminal 118. The transmit terminal 114 is connected to circuitry (not shown) that provides the outgoing RF signals, while the receive terminal 118 is connected to circuitry (not shown) that processes the received incoming RF signals. The bi-directional signal path 106 is used for both transmitting the outgoing RF signals and receiving the incoming RF signals.

The higher frequency band unit 102 includes a high pass filter (HPF) 122, which is positioned on the bi-directional signal path 106. The high pass filter 122 ensures that only received incoming RF signals in the higher frequency bands, e.g., GSM 1800 and GSM 1900, are transmitted into the higher frequency band unit 102. The higher frequency band unit 102 further includes an amplifier 124, an inductor 126, an output matching network (OMN) 128 and a diode 130. The amplifier 124, the output matching network 128 and the diode 130 are connected in series on the transmit signal path 112. The inductor 126 is connected between a voltage supply terminal 132, e.g., Vdc, and the transmit signal path 112 at a location between the amplifier 124 and the output matching network 128. The inductor 126 provides a path for DC bias current from voltage supply terminal 132 to the transmit signal path 112, while also blocking the RF signal from the voltage supply terminal. The amplifier 124 provides amplification for outgoing RF signals applied to the transmit terminal. The output matching network 128 (sometimes known as an "impedance matching network") transforms the impedance of the amplifier 124 from it's native impedance (e.g., 1 or 2 Ohms) to the required impedance of the antenna 120 (e.g., 50 Ohms). The diode 130 provides either a low resistance or a high resistance on the transmit signal path 112, depending on the current conducted through the diode 130. Thus, the diode 130 can be considered as a variable resistance device. The diode 130 effectively functions as a switch to isolate the transmit signal path 112 from the bi-directional signal path 106 and the receive signal path 116 for RF signals when the diode 130 is turned off (high resistance) or to connect the transmit signal 112 path to the bi-directional signal path 106 and the receive signal path 112 for RF signals when the diode 130 is turned on (low resistance).

The higher frequency band unit 102 also includes a capacitor 134, a transmission line 136, a diode 138, an optional resistor 140 and a switching device 142. The capacitor 134 and the transmission line 136 are connected in series on the receive signal path 116. The capacitor 134 prevents the flow of the DC bias current from the inductor 126, but allows transmission of RF signals. When the diode 138 is on, the transmission line 136 creates the appearance of an open circuit for RF signals of the frequency such that the transmission line is a quarter wavelength long. Thus, during a transmitting mode when the diode 138 is short, the quarter-wave transmission line 136 prevents the outgoing RF signals on the transmit signal path 112 from traveling through the receive signal path 116. Conversely, during receiving and standby modes when the diode 138 is open, the quarter-wave transmission line 136 allows received incoming RF signals to travel through the receive signal path 116 to the receive terminal 118.

The diode 138 of the higher frequency band unit 102 is connected between the transmission line 136 and ground. Similar to the other diode 130 on the transmit signal path 112, the diode 138 provides either a low resistance or a high resistance, depending on the current conducted through the diode 138. Thus, the diode 138 effectively functions as a switch to selectively prevent received incoming RF signals from traveling through the diode 138. Rather, when the diode 138 is off (high resistance), the received incoming RF signals on the receive signal path 116 are routed to the receive terminal 118.

The switching device 142 in the form of a transistor and the optional resistor 140 of the higher frequency band unit 102 are connected in series on a bypass current path 144 that circumvents the capacitor 134 on the receive signal path 116. One end of the bypass current path 144 is connected to the receive signal path 116 between the capacitor 134 and the transmission line 136. The other end of the bypass current path 144 may be connected to the receive signal path 116 between the intersecting node 110 and the capacitor 134, to the intersecting node 110, to the bi-directional signal path 106 between the intersecting node 110 and the high pass filter 122, or to the transmit signal path 112 between the diode 130 and the intersecting node 110. The transistor 142 is used as a switch to essentially close (off-state) or open (on-state) the bypass current path 144 to selectively allow the DC bias current from the inductor 126 to be conducted through the diodes 130 and 138. The state of the transistor 142 is controlled by a control signal applied to the control node of the transistor. The on-state of the transistor 142 and the resistance of the resistor 140 define the current through the shorted diode 138, as well as the current through the diode 130 on the transmit signal path 112. The resistor 140 may not be needed if the transistor 142 is controlled to provide sufficient current through the diodes 130 and 138. When the transistor 142 is switched to the off-state, the resistance of the bypass current path 144 becomes very high, and thus, the flow of current through the diodes 130 and 138 is stopped, which enables received incoming RF signals to be routed through the receive signal path 116 to the receive terminal 118. The transistor 142 can be any type of transistor. As an example, the transistor 142 may be a metal-oxide semiconductor (MOS) transistor.

Different operational modes of the higher frequency band unit 102 of the IC 100 are now described. During standby and receiving modes, the transistor 142 is switched to the off-state, i.e., deactivated, by applying, for example, a low control signal on the gate of the transistor. Consequently, the bypass current path 144 is closed, and thus, the DC bias current from the high voltage terminal 132 is not conducted through the diodes 130 and 138 due to the capacitor 134 on the receive signal path 116. Therefore, each of the diodes 130 and 138 provides a high resistance that prevents RF signals from traveling through that diode. In this state, when incoming RF signals in the higher frequency band, e.g., GSM 1800 and GSM 1900, are received at the antenna 120, the received incoming RF signal are transmitted through the high pass filter 122 toward the intersecting node 110. The received incoming RF signals are then prevented from traveling through the diode 130 on the transmit signal path 130 due to the high resistance provided by the diode 130, and thus, the received incoming RF signals are directed to the receive signal path 116 through the capacitor 134 and the transmission line 136. The received incoming RF signals are prevented from traveling through the diode 138 due to the high resistance provided by the diode 138, and thus, the received incoming RF signals are directed to the receive terminal 118, which leads to the circuitry that processes the received incoming RF signals.

During a transmitting mode, the transistor 142 is switched to the on-state, i.e., activated, by applying, for example, a high control signal on the gate of the transistor. Consequently, the bypass current path 144 is opened, and thus, the DC bias current from the high voltage terminal 132 is conducted through the diodes 130 and 138 by circumventing the capacitor 134 on the receive signal path 116. Therefore, each of the diodes 130 and 138 provides a low resistance that allows RF signals to travel through that diode. In this state, when outgoing RF signals in the higher frequency band, e.g., GSM 1800 and GSM 1900, are applied to the transmit terminal 114, the outgoing RF signals are transmitted through the diode 130 on the transmit signal path 112, after being amplified by the amplifier 124 and transmitted through the output matching network 128. The outgoing RF signals are prevented from traveling through the receive signal path 116 due to the quarter-wave transmission line 136, as described above. Thus, the outgoing RF signals are transmitted through the high pass filter 122 to the antenna, where the outgoing RF signals are broadcast.

Similar to the higher frequency band unit 102, the lower frequency band unit 104 of the integrated circuit 100 includes a bi-directional signal path 106' connected to the receive-and-transmit terminal 108 and an intersecting node 110', a transmit signal path 112' connected to a transmit terminal 114' and the intersecting node 110', and a receive signal path 116' connected to a receive terminal 118' and the intersecting node 110'. The transmit terminal 114' is connected to circuitry (not shown) to provide outgoing RF signals in the lower frequency bands, e.g., GSM 850 and GSM 900, while the receive terminal 118' is connected to circuitry (not shown) to process received incoming RF signals in the lower frequency bands. The lower frequency band unit 102 also includes a bypass current path 144'. Furthermore, the lower frequency band unit 104 includes an amplifier 124', an inductor 126', an output matching network (OMN) 128', diodes 130' and 138, a capacitor 134', a quarter-wave transmission line 136', an optional resistor 140' and a switching device 142'. However, in contrast to the higher frequency band unit 102, the lower frequency band unit 104 includes a low pass filter (LPF) 122' instead of the high pass filter 122. The low pass filter 122' ensures that only received incoming RF signals in the lower frequency bands, e.g., GSM 850 and GSM 900, are transmitted into the lower frequency band unit 104.

The lower frequency band unit 104 operates in a manner similar to the higher frequency band unit 102. During standby and receiving modes, the transistor 142' is switched to the off-state so that the bypass current path 144' is closed. Thus, the DC bias current from a voltage supply terminal 132' is not conducted through the diodes 130' and 138' due to the capacitor 134' on the receive signal path 116'. As a result, each of the diodes 130' and 138' provides a high resistance, which routes received incoming RF signals in the lower frequency bands through the receive signal path 116' to the receive terminal 118'. During a transmitting mode, the transistor 142' is switched to the on-state so that the bypass current path 144 is opened. Thus, the DC bias current from the voltage supply terminal 132' is conducted through the diodes 130' and 138' by circumventing the capacitor 134' on the receive signal path 116'. As a result, each of the diodes 130' and 138' provides a low resistance, which routes outgoing RF signals in the lower frequency bands to the antenna 120 through the bi-directional signal path 106' for broadcast.

Figure 2:
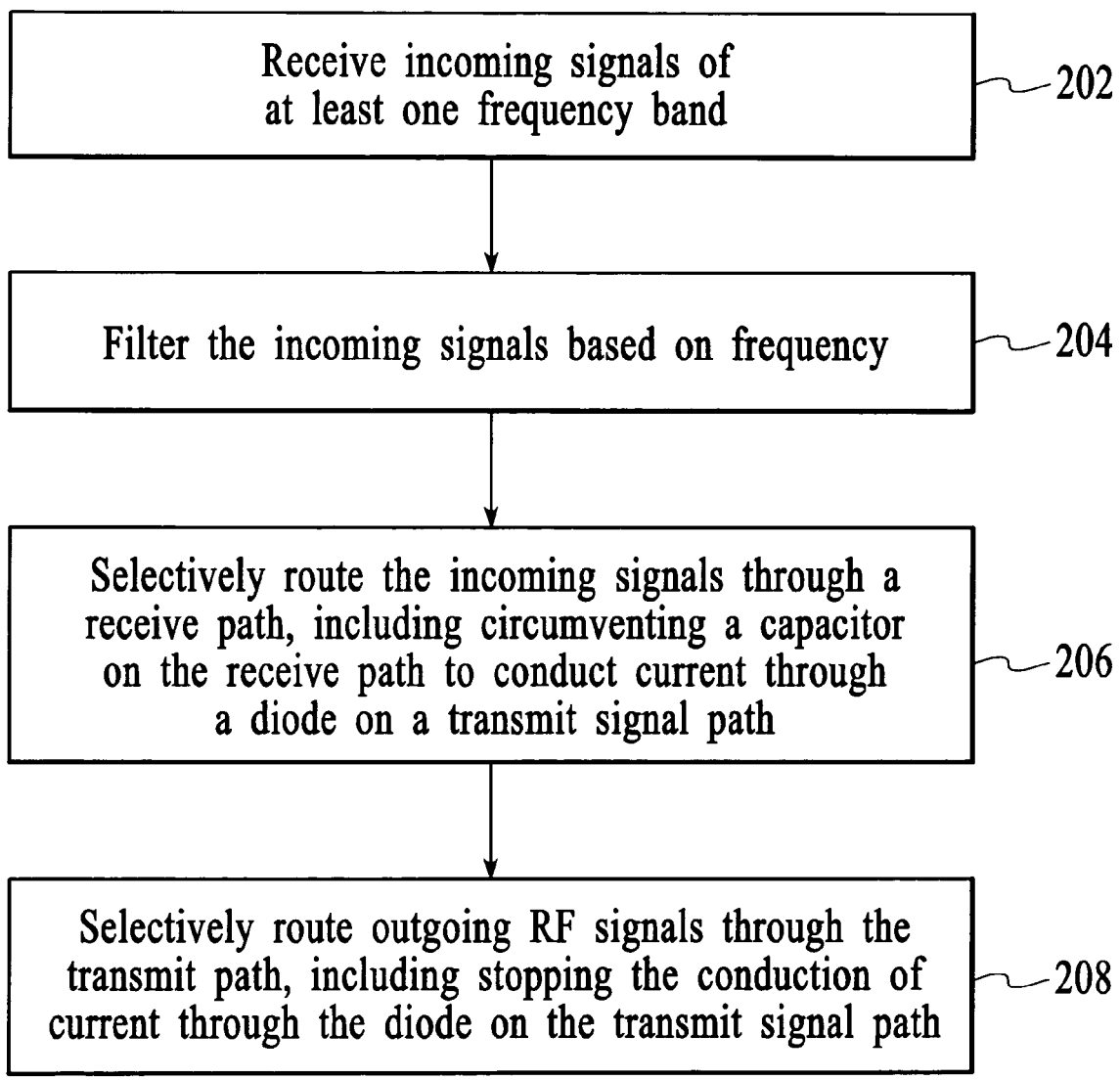
FIG. 2 is a flow diagram of a method for receiving and transmitting signals of different frequency bands in accordance with an embodiment of the invention.

A method for receiving and transmitting RF signals of different frequency bands in accordance with an embodiment of the invention is described with reference to a flow diagram of FIG. 2. At block 202, incoming signals of at least one frequency band are received. Next, at block 204, the incoming signals are filtered based on frequency. Next, at block 206, the incoming signals are selectively routed through a receive signal path for processing. Furthermore, at block 206, a capacitor on the receive path is circumvented to conduct current through a diode on a transmit signal path connected to the receive signal path to prevent the incoming signals from traveling through the transmit signal. Blocks 202-206 are performed to receive incoming RF signals. In order to transmit outgoing RF signals of at least one frequency band, the outgoing RF signals are selectively routed through the transmit path, at block 208. Furthermore, at block 208, the conduction of current through the diode on the transmit signal path is stopped to transmit the outgoing RF signals through the diode.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit for receiving and transmitting signals of different frequency bands comprising:
   a transmit signal path connected to an intersecting node, the transmit signal path being used to transmit outgoing signals of at least one frequency band;
   a variable resistance device on the transmit signal path;
   a receive signal path connected to the intersecting node, the receive signal path being used to receive incoming signals of at least one frequency band;
   a capacitive device on the receive signal path;
   a bi-directional signal path connected to the intersecting node and a receive-and-transmit terminal;
   a bypass path that circumvents the capacitance device on the receive signal path; and
   a switching device on the bypass path to control resistance through the bypass path.

2. The integrated circuit of claim 1 wherein the variable resistance device includes a diode.

3. The integrated circuit of claim 1 wherein the switching device includes a transistor.

4. The integrated circuit of claim 1 wherein the capacitive device includes a capacitor.

5. The integrated circuit of claim 4 further comprising a quarter-wave transmission line connected to the capacitor on the receive signal path.

6. The integrated circuit of claim 5 further comprising a shorted diode connected to the quarter-wave transmission line.

7. The integrated circuit of claim 1 further comprising an amplifier and an output matching network connected in series on the transmit path.

8. The integrated circuit of claim 1 further comprising comprising:
- a second transmit signal path connected to a second intersecting node;
- a second variable resistance device on the second transmit signal path;
- a second receive signal path connected to the second intersecting node;
- a second capacitive device on the second receive signal path;
- a second common signal path connected to the second intersecting node to the receive-and-transmit terminal;
- a second bypass path that circumvents the second capacitance device on the second receive signal path; and
- a second switching device on the second bypass path to control resistance through the second bypass path.

9. An integrated circuit for receiving and transmitting signals of different frequency bands comprising:
- an amplifier on a first signal path to provide outgoing signals of at least one frequency band;
- an output matching network connected in series with the amplifier on the first signal path;
- a diode connected in series with the output matching network;
- a capacitor on a second signal path connected to the first signal path;
- a transmission line connected in series with the capacitor on the second signal path; and
- a switching device connected on a third signal path that circumvents the capacitor.

10. The integrated circuit of claim 9 wherein the switching device includes a transistor.

11. The integrated circuit of claim 9 wherein the transmission line is a quarter-wave transmission line.

12. The integrated circuit of claim 9 further comprising a shorted diode connected to the transmission line.

13. The integrated circuit of claim 9 further comprising:
- a second amplifier on a fourth signal path to provide second outgoing signals of at least one frequency band;
- a second output matching network connected in series with the second amplifier on the fourth signal path;
- a second diode connected in series with the second output matching network;
- a second capacitor on a fifth signal path connected to the fourth signal path;
- a second transmission line connected in series with the second capacitor on the fifth signal path; and
- a second switching device connected on a sixth signal path that circumvents the second capacitor.

14. A method for receiving and transmitting signals of different frequency bands, the method comprising:
- receiving incoming signals of at least one frequency band;
- filtering the incoming signals based on frequency; and
- selectively routing the incoming signals through a receive signal path for processing, including circumventing a capacitive device on the receive signal path to conduct current through a variable resistance device on a transmit signal path connected to the receive signal path to prevent the incoming signals from traveling through the transmit signal path.

15. The method of claim 14 wherein the circumventing the capacitive device includes circumventing the capacitive device on the receive signal path to conduct current through a diode.

16. The method of claim 14 further comprising transmitting the incoming signals through a quarter-wave transmission line on the receive signal path.

17. The method of claim 14 wherein the circumventing the capacitive device includes activating a switching device on a bypass path that circumvents the capacitive device on the receive signal path.

18. The method of claim 14 wherein the selectively routing the incoming signals includes conducting current through a shorted variable resistance device connected to the receive signal path.

19. The method of claim 14 further comprising selectively routing outgoing signals of at least one frequency band through the transmit signal path, including stopping conduction of current through the variable resistance device to decrease resistance of the variable resistance device on the transmit signal path to transmit the outgoing signals through the variable resistance device.

20. The method of claim 19 wherein the selectively routing the outgoing signals of at least one frequency band further includes deactivating a switching device on a bypass path that circumvents the capacitive device on the receive signal path.

* * * * *